Aug. 22, 1961  G. C. HARTLEY  2,997,545
AUTOMATIC TELECOMMUNICATION EXCHANGES
Filed May 3, 1957  7 Sheets-Sheet 6

Inventor
G. C. Hartley
By
Robert Harding Jr.
Attorney

Aug. 22, 1961  G. C. HARTLEY  2,997,545
AUTOMATIC TELECOMMUNICATION EXCHANGES
Filed May 3, 1957  7 Sheets-Sheet 7

Inventor
G. C. Hartley
By
Robert Hardwick
Attorney

United States Patent Office 2,997,545
Patented Aug. 22, 1961

2,997,545
AUTOMATIC TELECOMMUNICATION EXCHANGES
George Clifford Hartley, London, England, assignor to International Standard Electric Corporation, New York, N.Y., a corporation of Delaware
Filed May 3, 1957, Ser. No. 656,805
Claims priority, application Great Britain May 8, 1956
14 Claims. (Cl. 179—15)

The present invention relates to automatic telecommunication exchanges, and more particularly to such exchanges in which multiplex arrangements are used.

According to the present invention there is provided an automatic telecommunication exchange which comprises a link group interconnecting a number of inlets thereto and a number of outlets therefrom, a first switching stage via which calling subscribers' lines may be extended to available inlets to said link group, marking means which, in response to the reception from calling subscriber's lines of wanted subscribers' numbers, marks said wanted subscribers' lines, a second switching stage via which marked wanted subscribers' lines may be extended to an available outlet from said link group, and a control circuit for said link group which causes said link group to interconnect inlets thereto to which calling subscribers' lines have been extended and outlets therefrom to which the corresponding wanted subscribers' lines have been extended.

According to the present invention there is provided an automatic telecommunication exchange which comprises a single time division multiplex system whose link group is connected via first gating means to a number of inlets to said system and via second gating means to a number of outlets from said system, said multiplex system providing less time division channels than there are inlets or than there are outlets, each of said channels being available when free for use in connection with any one of said inlets or any one of said outlets; a first switching stage via which a calling subscriber's line may be extended to an available inlet to said multiplex system; marking means which, in response to the reception from a calling subscriber's line of a wanted subscriber's number, marks said wanted subscriber's line; a second switching stage via which a marked wanted subscriber's line may be extended to an available outlet from said multiplex system; and a control circuit for said multiplex system which selects a free time division channel for a connection being set up, whereafter said first gating means repeatedly interconnects the inlet to which said calling line has been extended and the link group at the time position corresponding to the selected channel and repeatedly interconnects the outlet to which said wanted line has been extended and the link group at the time position corresponding to the selected channel, whereby said calling subscriber's line and said wanted subscriber's line are interconnected via said first switching stage, said multiplex system, and said second switching stage.

According to the present invention there is provided an automatic telecommunication exchange which comprises a number of time division multiplex systems for interconnecting a number of groups or inlets to said systems and a number of groups of outlets from said systems, each said multiplex system providing less time division channels than there are inlets or outlets in the group which it serves and said systems all providing the same number of channels, first gating means via which the inlets of a group are connected to the link group of the multiplex system serving that group, second gating means via which the outlets of a group are connected to the link group of the multiplex system serving that group, further gating means via which the link groups of the multiplex systems serving said groups of inlets are connected to the link groups of the multiplex systems serving said groups of outlets, a first switching stage via which a calling subscriber's line may be extended to an available inlet to one of said multiplex systems, marking means which, in response to the reception from a calling subscriber's line of a wanted subscriber's number, marks said wanted subscriber's line, a second switching stage via which a marked wanted subscriber's line may be extended to an available outlet from one of said multiplex systems, and a control circuit for said multiplex systems which selects a time division channel which is free both in the multiplex system serving the group of inlets including the inlet to which the calling line has been extended and in the multiplex system serving the group of outlets including the outlet to which the wanted line has been extended, whereafter said inlet and said outlet are repeatedly interconnected at the time position corresponding to the selected channel via said first gating means, the link group of the multiplex system serving that inlet's group, said further gating means, the link group of the multiplex system serving that outlet's group, and said second gating means, whereby said calling subscriber's line and said wanted subscriber's line are interconnected via said first switching stage, said multiplex arrangement, and said second switching stage.

According to the present invention there is provided an automatic telecommunication exchange in which a time division multiplex system provides a number of connecting channels over which communication connections are established and a number of further channels which are used for the transmission of supervisory information relating to connections established via said connecting channels, in which said connecting channels and said further channels are conveyed over the same multiplex link group, in which said further channels are each available for use for the transmission of supervisory information in respect of a connection established over a particular one of said connecting channels, and in which the common repetition frequency of said further channels is a sub-multiple of the common repetition frequency of said connecting channels.

The invention will now be described with reference to the accompanying drawings, in which.

General introduction

The automatic telephone exchanges which are described herein use pulse amplitude modulated time division multiplex arrangements, although other forms of multiplex arrangement might be used. In the exchanges described herein, a calling subscriber's line is automatically extended when the call is initiated via a first switching stage to an inlet to a multiplex arrangement. The reception of the called subscriber's number causes the called subscriber's line to be extended via a further switching stage to an outlet from the multiplex arrangement. Then control circuits associated with the multiplex arrangement operate to interconnect the seized inlet thereto and outlet therefrom in multiplex fashion.

In a first embodiment of the invention the multiplex arrangement is a single time division multiplex system whose link group is connected via a set of gates to the above-mentioned inlets and via another set of gates to the above-mentioned outlets. The system provides a number of time division channels which is substantially less in number than the number of the outlets, or of the number of the inlets. The control circuits part in setting up the connection is to choose a free time division channel, if any, and to so control the seized inlet's gate and the seized outlet's gate that those gates are repeatedly opened at the time position which corresponds to the free time division channel. Obviously if there is no such free channel, then busy tone is reverted to the calling subscriber's line, and the connection from the wanted subscriber's line to the outlet from the multiplex arrangement is broken down.

In a second embodiment of the invention, intended for a large, heavy-traffic exchange the multiplex arrangement is considerably more complex. The inlets are subdivided into groups, and each group of inlets is served by a time division multiplex system. The link group of each such system is connected via gates to all of the inlets which it serves, and the system provides a number of time division channels which is less than the number of inlets in the group of inlets which it serves. The outlets from the multiplex arrangement are also split up into a number of groups, each group being served by a time division multiplex system. Each of these systems has its link group connected via gates to all of the outlets which it serves, and provides a number of time division channels which is less than the number of outlets in the group of outlets which it serves. The link groups of the two sets of multiplex systems are interconnected via further gating arrangements so that any link group at an inlet-serving multiplex can be connected to any link group of an outlet-serving multiplex. Thus the interconnections between the two link groups can be visualised as being a co-ordinate array. All of the multiplex systems are identical, apart from the fact that the sizes of the groups of inlets and of outlets may be varied according to traffic requirements. The control circuit of the multiplex arrangement selects a free route therethrough by choosing a time position channel which is free both in the multiplex systems serving the group of inlets to which a calling line has been extended and in the system serving the group of outlets to which a called line has been extended. No conflict is possible because the control circuit performs this selection operation for only one call at a time. When a free path has been chosen the gate between the seized inlet and its link group, the gate between the seized outlet and its link group, and the gate between the two link groups in question are thereafter repeatedly opened at the time position for the seized channel. In this case the multiplex arrangement will be seen to be of the type described and claimed in British Patent No. 765,681, published May 1, 1957.

In both embodiments of the invention, there is a fixed period allotted to the control circuit for the selection and establishment of a connection through the multiplex arrangement. If there is no free path, the fact that no free path has been found at the expiration of the fixed period just mentioned causes busy tone to be transmitted to the calling subscriber's line.

In the two telephone exchanges which are described in some detail in the present specification, the connections through the multiplex arrangement are set up over single link groups, each of which conveys both the "forward" and "return" modulated pulses. However, it may be preferable to use separate "forward" and "return" link groups. Therefore when the term "link groups" is used in the present specification and in the attached statement of claims, it is to be remembered that the invention is applicable to systems wherein separate "forward" and "return" link groups are used.

It should further be noted that the two switching stages via which calling and wanted subscriber's lines are extended to the multiplex arrangement need not be co-ordinate static electrical switch arrays, as is the case in the exchanges shown. For instance, they could be mechanical cross-bar switches, and could even be other time division multiplex arrangements.

It is, as is well known, necessary to cater for cross-office supervision in automatic telecommunication exchanges, and this is done, according to the present invention, by arrangements which are, in effect, slow running multiplex systems which use the same link groups as the multiplexes used for communication purposes. Two methods are proposed which embody this principle.

In the first method, the multiplex cycle of a multiplex system has an extra time position added to its cycle which is used for supervisory intelligence. Thus for a telecommunication exchange using one or more $n$ channel multiplex systems, each such system has its cycle increased to $(n+1)$ time positions. The $(n+1)$th time position then executes a subsidiary cycle having a time position per channel, so that on each cycle of the main, or communication, multiplex the $(n+1)$th time position is available to convey supervisory intelligence in respect of one of the $n$ communication channels. Hence the cycle for the sub-multiplex formed by the $(n+1)$th time position would last for $n$ cycles of the normal multiplex. That is, assuming that the sampling frequency on the communication channels is 10,000 per second, then the sampling frequency for the supervisory intelligence is only $10000/n$ cycles per second. It will be seen that there is the same uniqueness about the application of the appropriate one of the auxiliary, or sub-multiplex, time positions, to a communication connection. During the auxiliary time positions the originating and terminating circuit units associated with the above-mentioned inlets and outlets respectively, are momentarily switched to a condition for dealing with supervisory intelligence.

An alternative method of dealing with cross-office supervision is to set aside one complete multiplex cycle in every 1000 for supervision. Thus if, as already assumed, the multiplex cycles occur at 10 kc./s., i.e. with $n$ channels per multiplex the frequency is $10n$ kc./s., one complete cycle in 1000 could be removed with negligible effect on communication connections. During this cycle, the multiplex system (or systems) function in the normal manner, but the originating and terminating circuit units are all switched to deal with supervisory intelligence. Thus supervision at 10 cycles per second is obtained.

The various embodiments of the invention shown in the accompanying drawings will now be described in detail.

Figure 1:
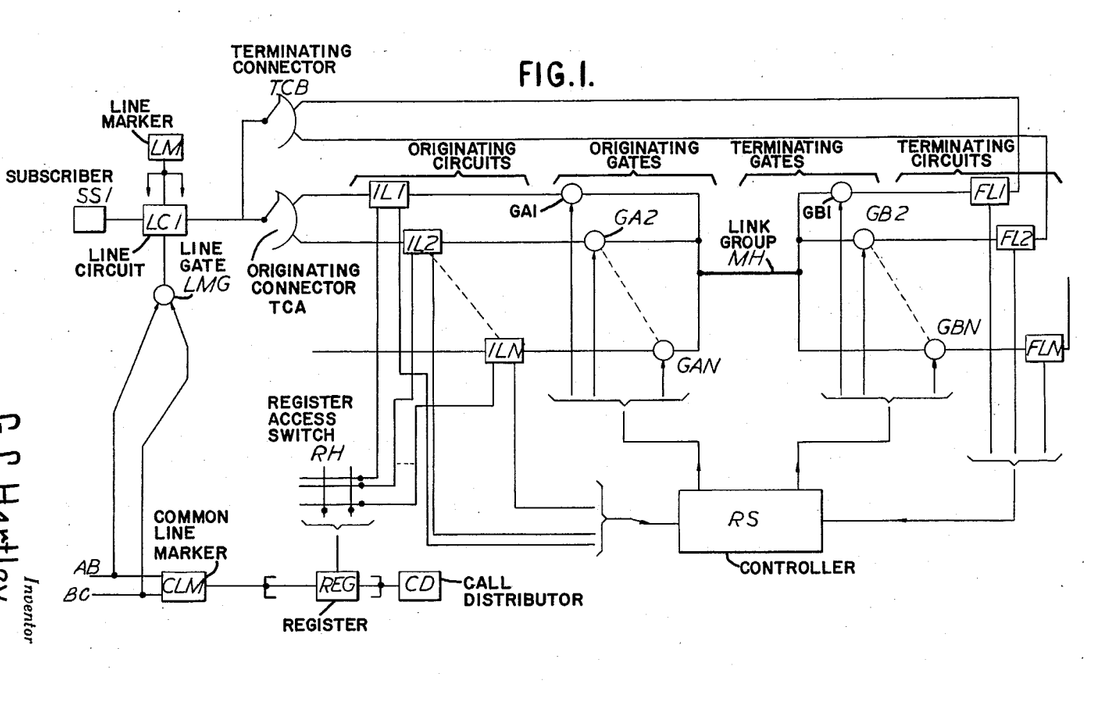
FIG. 1 is a simplified block schematic of a telephone exchange according to the present invention wherein the switching stages are static electrical selector switch devices and the multiplex arrangement is a single time division multiplex system.

The first embodiment (FIG. 1)

In this exchange, each subscriber's line circuit such as LC1 is connected via two individual switches, known as originating and terminating terminal connectors, of which originating connector TCA is used to extend connection from calling lines, while terminating connector TCB is used to extend connections from called lines. These switches are preferably static electrical co-ordinate multi-switches, such as are used in the exchange described in our copending patent application Serial No. 536,963, filed September 27, 1955, although mechanical switches may be used.

When a subscriber initiates a call, a calling line marker LM serving a block of lines including the caller, is seized. Where the terminal connectors are coordinate multi-switches, each marker such as LM serves a block of, say 50, lines each of which is connected to a different co-ordinate multi-switch. This is desirable to ensure that the static electrical circuits shall function on a one-at-a-time basis. The seizure of a marker such as LM immediately locks out all other such markers, and also causes LM to mark all of the line circuits it serves. One of them, e.g. LC1, will be both marked from its circuit LM and calling, and this one will be extended by its originating connector TCA for outgoing calls to a free first link such as 1L1. In the case of the static electrical switches, this connection serves at "electronic" speeds, i.e. almost immediately, but if mechanical switches are used, the marking mentioned causes some control device associated with a switch such as originating connector TCA to be operated, whereafter LM is released and the switch connection is effected by originating connector TCA at its own speed.

The seized first link now seizes a free register such as REG via a co-ordinate multi-switch such as RH known as a register access switch. This also is preferably a static electrical switching arrangement. When the register has been seized, dial tone is sent to the calling subscriber via the switch RH, the seized originating circuit unit such as 1L1, the originating terminal connector TCA and his line circuit such as LC1. The caller now dials the wanted subscriber's number, which is received and stored in the register.

Associated with all of the registers is a call distributor CD, which allows only one register at a time to be engaged in call setting. Since the register is a static electrical arrangement this gives fully adequate service. When a register has fully received a wanted number, or sufficient thereof to control the seizure of an outgoing junction, call distributor CD gives it a "go-ahead" signal whereafter a predetermined period is allotted for connecting the called line (or wanted junction) to an outlet from the multiplex arrangement. Obviously if more than one register is ready to set up a call, only one can do so because of the one-at-a-time feature connected on.

When a register receives the "go-ahead" signal, it transmits the wanted number which it has received and stored to a common line marker CLM which serves the whole exchange. This marker marks the called line's line circuit via a path which does not include paths via which communication connections are set up. Assuming that 4 digit numbers are used, CLM energises a bus bar AB which corresponds to the first two digits of the number, and a bus bar BC which corresponds to the last two digits of the number.

Each line circuit includes a gate such as LMG for LC1, known as a line mark gate, and each line mark gate is connected to the two bus-bars such as AB and BC which correspond to the number of its line circuit. Therefore the gate LMG of the called line is marked, which sets the corresponding line circuit to the "called" condition. Assuming for the moment that LC1 is the line circuit for the called line, the setting thereof to a "called" condition causes its switch for incoming calls, i.e. the terminating terminal connector TCB, to seize a free terminating circuit such as FL1. This occurs in a manner similar to that used for seizing an originating circuit. As in the case of the originating connector TCA, terminating connectors TCB are preferably static electrical arrangements, but may be mechanical switches.

After the fixed period mentioned, the register used for the connection, and the called line marker CLM are released. However, if the wanted line is busy, the fact that no connection has been set up when that period ends causes busy tone to be sent to the calling subscriber's line. The called line marker include arrangements for causing the application of number unobtainable tone when this is required.

The above operations are generally similar to the corresponding operations in the telephone exchange which is described in detail in the aforesaid co-pending patent application No. 536,963, and so no detailed description thereof is necessary here.

The multiplex arrangement includes a single time division multiplex system having a link group MH, which is connected via gates GA1, GA2 ... GAN to the originating circuits 1L1, 1L2 ... 1LN respectively, and via the gates GB1, GB2 ... GBN to the terminating circuits FL1, FL2 ... FLN respectively. As already mentioned, the system provides a number of time division channels which is less in number than the number of originating circuits or the number of terminating circuit. The controller RS which forms the control circuit for the multiplex systems includes storage arrangements having a "compartment" per channel for controlling gates GA and a similar storage arrangement for controlling the gates GB. It also includes an electronic circuit which selects a free channel for a call when an originating and a terminating circuit therefor have been seized. Obviously controller RS deals with calls one at a time.

When the originating and terminating circuits to be used for a call have been chosen, their identities are signalled to RS, which selects a free time division channel, and records the identities of the two links in the appropriate sections of the storage. Thereafter RS is available for another call. If there is no free channel, busy tone is sent to the caller, and the connections from the called line to the seized terminating circuit is broken down. After a free channel has been selected, the seized originating and terminating circuits are repeatedly connected to the link group MH via the appropriate ones of the gates GA and GB respectively for as long as the call persists.

When release occurs, this fact is detected via the supervisory arrangements to be mentioned later, and causes release of the connection.

As an alternative, instead of providing the controller RS with storage for recording the numbers of the circuits to be interconnected, each gate such as GA or GB could be provided with its own storage wherein would be stored the identification of its opening time. This will be described in more detail in connection with the second embodiment.

*The second embodiment (FIGS. 2 and 3)*

Figure 2:
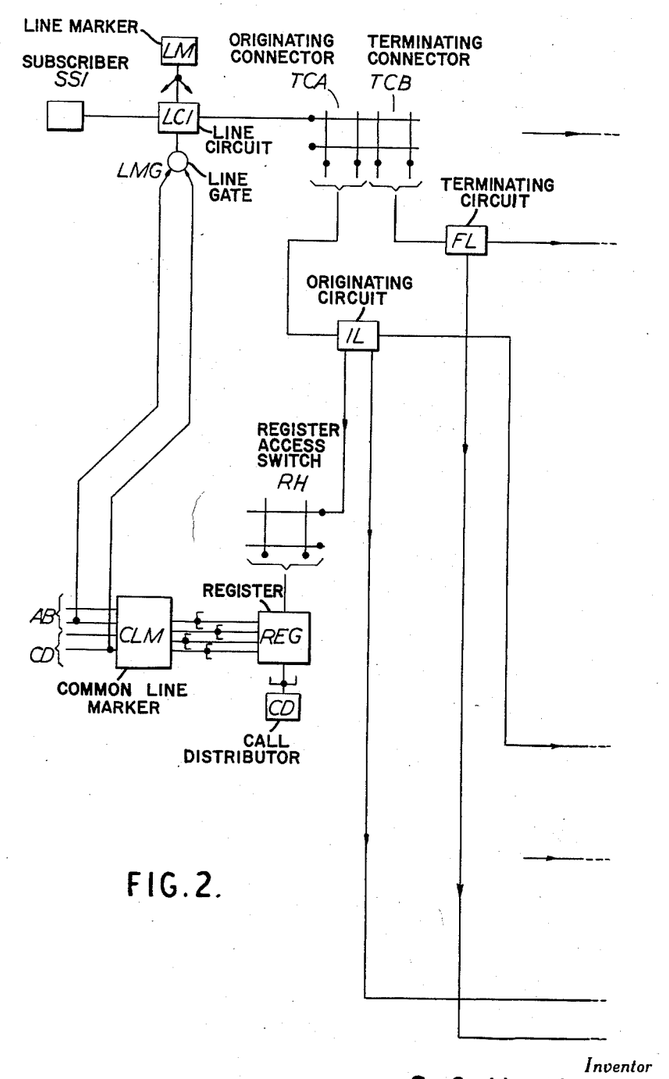
FIGS. 2 and 3, of which FIG. 3 should be placed to the right of FIG. 2, together show a simplified block schematic of a further telephone exchange according to the present invention, wherein the switching stages are static electrical selector switch devices and the multiplex arrangement includes a number of time division multiplex systems.

This arrangement is intended for use in a large exchange which has to cater for relatively dense traffic. The portion of the circuit shown in simplified form on FIG. 2 is similar to the corresponding portions already described with respect to FIG. 1 and described in detail in the aforesaid co-pending application.

Each line circuit such as LC1 (FIG. 2) is connected via one or more individual switches such as originating connector TCA to a number of originating circuits such as 1L, and via one or more individual switches such as terminating connector TCB to a number of terminating circuits such as FL. The originating and terminating connectors TCA and TCB are subscriber's individual switches for outgoing and incoming connections respectively. As in the system described in our above mentioned patent specification static electrical co-ordinate multiswitches may be used, although other switching arrangements are possible.

When a subscriber initiates a call, the looping of his line causes the originating terminal connector such as TCA which deals with outgoing calls to be seized. This then interconnects the calling line and a free originating circuit such as 1L, which will in due course be connected effectively to a multiplex link group such as HA1.

Figure 3:
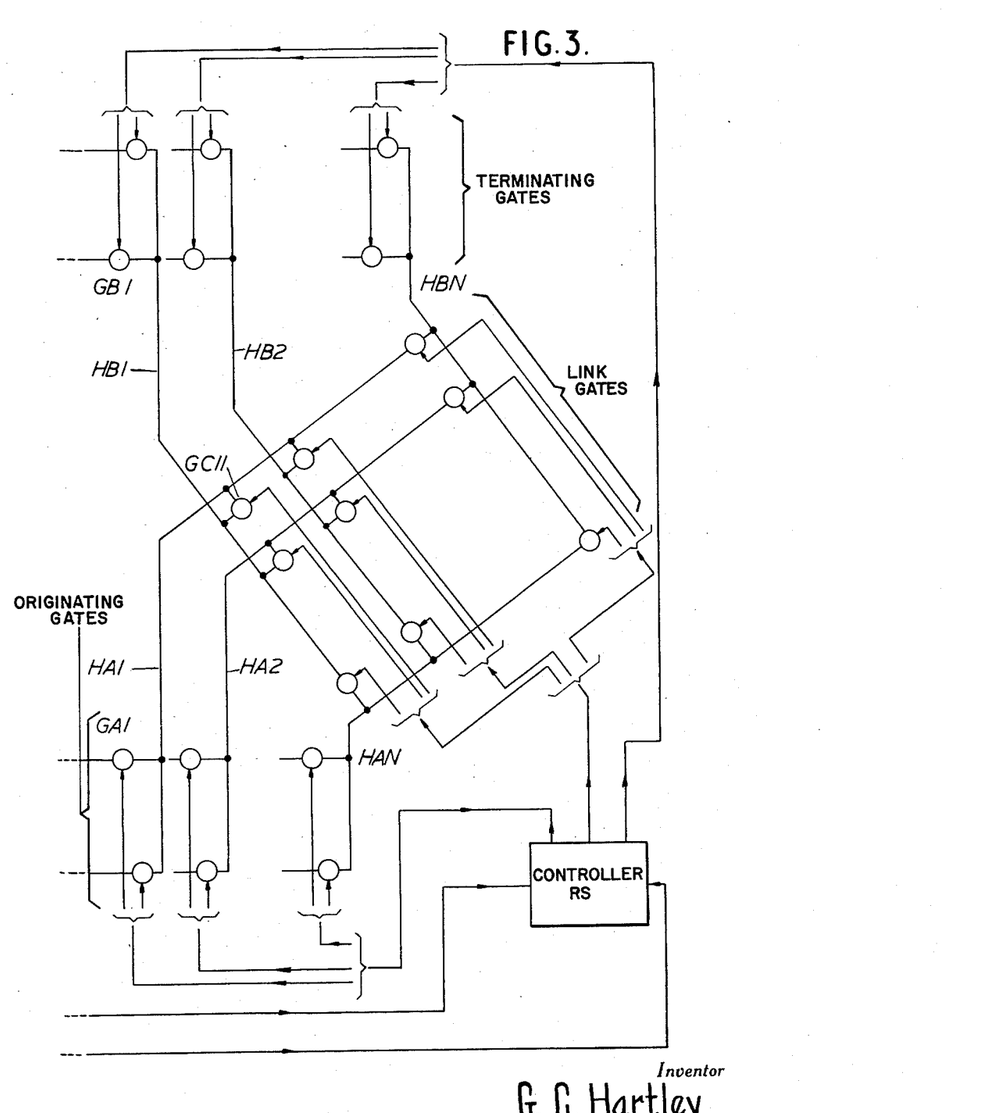

The multiplex arrangement consists of a "double multiplex" arrangement such as is described in British Patent No. 765,681. In this arrangement the inlets to the multiplex arrangement are divided into a number of groups, and each group of inlets is served by a single multiplex link group such as HA1. Each link group is connected via respective gates such as GA1 to all of its inlets, i.e. to all of the first links which it serves. All of the multiplex systems which serve inlet groups, and of whose link groups HA1, HA2, . . . HAN are shown, are identical. Each provides a number of time division channels each of which is available when free to any one of the first links it serves. The numbers of first links in each group may vary, being dependent on the traffic handling to be catered for.

In a similar manner, the final links are split into a number of groups each served by a multiplex system. All of these multiplex systems are identical and each is identical with the multiplex systems serving groups of inlets. Of these multiplex systems link groups HB1, HB2, . . . HBN are shown. Each of these link groups is connected via the respective gates such as GB1 to the outlets, i.e. to the terminating circuits, which it serves.

Each link group of a multiplex system serving a group of inlets can be connected via a gate such as GC1 to any link group serving a group of outlets. Hence the two sets of link groups forms, in effect, a co-ordinate interconnection arrangement. Therefore they are drawn in FIG. 3 as a co-ordinate network.

When a connection is to be set up the connection uses the same time position in the two multiplex systems via which it is to be set up.

To return to the description of the setting up of a call, the seized originating circuit, such as 1L seizes a free register such as REG via a register access multi-switch RH, whereafter dial tone is sent to the calling subscriber, who dials the wanted number. This is received and stored in the seized register. The call distributor CD is arranged, as in the exchange of FIG. 1, to allow registers to set up calls one at a time, this giving fully adequate service because all operations are effected rapidly at "electronic" speeds.

When the call distributor CD gives the register a "go ahead" signal, the wanted number is transferred to a called line marker CLM. This, in the manner already described for the exchange of FIG. 1, marks the wanted line directly, i.e. via a path independent of the speech path, causing that line's line circuit to assume a "called line" condition. If the line is busy, no change is made to the condition of its line circuit, and busy tone is sent to the calling line and the called line marker and register are released. If the line is free, its assumption of the "called line" condition causes its terminating terminal connector, assumed for convenience to be TCB, which deals with calls incoming to it to seize a free terminating circuit such as FL. This terminating circuit is connected via a gate such as GB1 (FIG. 3) to the link group such as HB1 of a multiplex system serving a group of outlets from the multiplex arrangement. As will be clear from the foregoing description, the seized originating circuit is connected via a gate such as GA1 (FIG. 3) to the link group such as HA1 of a multiplex system serving a group of inlets to the multiplex arrangement.

A control circuit RS, which may be called a controller, now selects a free path via which the seized originating and terminating circuits for a call can be interconnected. The register and called line marker, whose functions have been completed are, of course, released. As in the case of the circuit of FIG. 1, RS handles connections one at a time. It selects a time division channel which is free both in the multiplex system serving the seized originating circuit and in the multiplex systems serving the seized terminating circuit. When such a channel has been selected, RS causes the gates such as GAL, GB1 and GC11 via which the connection is established to be repeatedly opened at the time position corresponding to that seized channel. Then RS is released, becoming available for use in connection with another call.

Now that the connection has been set up, ringing tone and current are supplied to the calling and called subscribers' lines respectively, either from the originating circuit or from the terminating circuit.

*Gate controlling arrangements*

As has been mentioned above, in the control of switching systems using time division multiplex arrangements, storage arrangements are used. There are two basic methods of controlling such arrangements. In the first method, which is used in the system described in British Patent No. 765,681, there is a store per time position at each stage at which time pulse control of gates is required. That is, for the set of gates such as GA1, the set of gates such as GB1, or the set of gates such as GC1, there is a set of stores equal in number to the number of time positions in the multiplex cycle. When a time position has been taken into use, the identity of the connection to be established is stored in the store for that time position. The gating network forming the switching stage with which the store is associated is then set, under control of the appropriate one of the stores, to make the required connection on each occurrence of an engaged time position. The use of this method in the exchange of FIG. 1 has also been described above.

In the second method, whose application to the exchange of FIG. 1 has also been described above, each gate in a switching stage is provided with its own store. When a connection via a given gate is to be set up, the time position at which that connection is to be set up is recorded in the store for that gate. Thereafter the gate is repeatedly opened at each occurrence of that time position for as long as the connection is to be maintained.

The arrangement will now be described with reference to the fragmentary diagram of FIG. 7. The stores associated with the individual gates of a single multiplex system each consist of a block of a ferrite material having a number of holes equal to the number of channels in the multiplex system, or a number of blocks if the number of channels renders one block undesirable. Similarly, of course, it could consist of a number of single magnetic core storage elements.

Where the storage is formed of one or more ferrite blocks per store, the material surrounding each hole in a block forms a single ferro-magnetic storage element, and each hole is threaded by a control wire to which is applied the time position pulse for that hole's time position. The master pulse generator from which the time position pulses are derived supplies to each control wire, at the appropriate time position in the cycle, a high-level reading pulse followed by a half-amplitude writing pulse, i.e. a read pulse followed by a half-write pulse. The set of holes (or individual ferro-magnetic storage elements if ferrite blocks are not used) of the store associated with a single gate are also threaded by a single "reading" wire which controls that gate.

Figure 7:
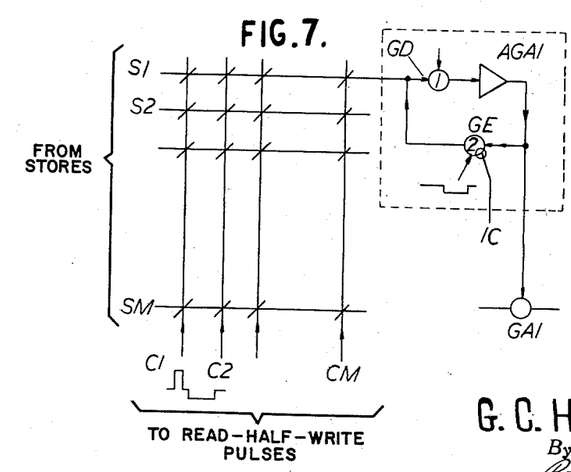
FIG. 7 is a fragmentary circuit diagram which indicates a possible gate-controlling arrangement for use in the exchange of FIGS. 2 and 3.

It is therefore apparent that the storage arrangements for the control of the gates of a single switching stage consist of a co-ordinate ferro-magnetic storage matrix, and this is what is shown in FIG. 7, together with circuit elements associated with the gate LA11. This latter is a gate for interconnecting an originating circuit and the multiplex link group associated therewith and corresponds to gate GA1 of FIG. 3. In FIG. 7, the rows S1, S2, . . . SM represent the various stores for the switching stage between link group HA1 and the originating circuits served thereby. Columns C1, C2, . . . CN each represent one of the supply wires for the read-half-write pulses.

The reading wire for each row is connected via a control gate GD such as GA1 to a gate controlling amplifier such as AGA1. If a time position has been recorded in the store S1 for gate GA1 by setting the storage element for that time position to its 1 state (assuming that the 0 state is the normal state), then when the read pulse for that time position occurs, an output pulse appears on the reading wire for that store S1. This pulse is applied via gate GD and amplifier AGA1 to the associated gate GA1, which is therefore opened for that time position. In addition, amplifier AGA1 transmits a half-write pulse to the reading wire for the respective store. Therefore the individual storage element (hole) from which reading occurred receives half-write pulses simultaneously on its row and column wires. Hence the recorded condition is re-recorded.

The process of originating a connection through a gate is to inject into its amplifier a pulse coincident with the half-write pulse for the required connection. For gate GA1, this pulse is inserted via the second control of the gate GD from which it passes via the amplifier AGA1 and "inhibit" gate GB. All half-write pulses are applied to the second control for this gate. A connection is released by applying a momentary inhibit connection to the connection IC for its gate GE, which prevents the re-recording of the information. Hence the information is cancelled from the store.

*Controller operation (FIGS. 4–6)*

Figure 5:
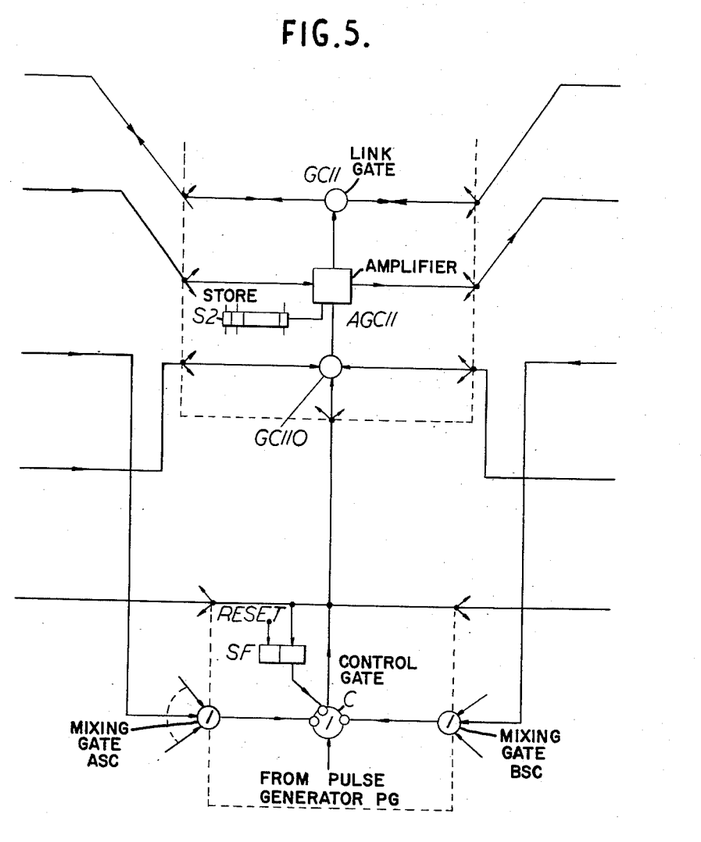
Figure 6:
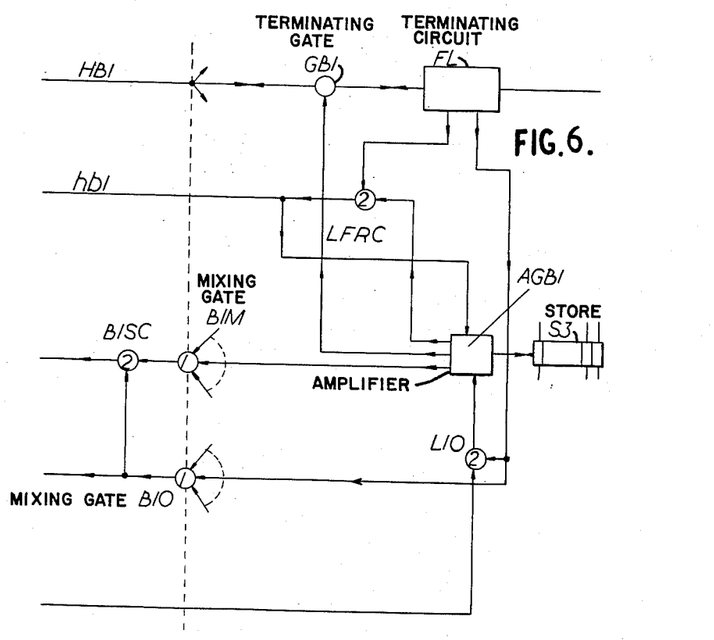

The operations which occur when a connection is set up via the "double multiplex" arrangement of FIGS. 2–3 will now be described with reference to FIGS. 4 to 6.

First, however, the basic principle of the controller operation will be described briefly. The controller is a simple gating circuit to which are applied pulses from the link group of the multiplex system serving the seized originating circuit, each pulse representing a channel of that multiplex which is in use. Also applied to the controller are pulses corresponding to channels in use in the multiplex system serving the seized terminating circuit. These two pulse supplies are connected as inhibiting inputs to a comparator gate to which are applied pulses corresponding to all channels of a multiplex system. Hence this gate passes a pulse for the first two division channels which is free in the multiplexes serving the seized circuits. This pulse inhibits the comparator gate to prevent multiple seizure, this inhibition being removed when another selection is to be made.

The pulse for the seized channel is sent to the seized originating circuit, where it causes the gate between that originating circuit and the multiplex link group to be so controlled as to thereafter open at that time position. From the originating circuit-link group gate the pulse passes via the link group to the "cross-point" gate between the two link groups to be used. Here also it causes the gate to be thereafter repeatedly opened at that time position. The pulse passes therefrom to the link group-terminating circuit gate, where it has the same effect as the pulse had on the originating circuit-link group gate.

Calling party release is used, and the release condition is detected at an originating circuit in use for a call. It immediately "releases" the gate between itself and the link group, and transmits a pulse over a subsidiary link group for the multiplex system to the "cross-point" gate, which it causes to be released also. From there a pulse is passed over a further subsidiary link group to the link group-terminating circuit gate, which it also released thereby.

Turning now to the detailed description of the controller, it will be remembered that connections are set up one at a time at "electronic" speeds, and that the circuit can only be called upon to set up one connection at a time. This will be between an originating circuit such as 1L (FIG. 4) to which the calling line has been extended and a terminating circuit such as FL (FIG. 6) to which the called line has been extended.

When the two circuits such as 1L and FL have been selected, the monitoring outputs of all of the amplifiers in each group concerned are gated down a common lead to the controller. Thus each gate store amplifier such as AGA1 applies pulses at every time position in use in its group to the gate A1SC via the mixing gate A1M. These gates serve the group of originating circuit including the "calling" circuit. A1SC is opened by an output from the originating circuit 1L via another mixing gate A10. As already mentioned, control of establishment of a connection is such that only one originating circuit is in the calling condition at once.

At the terminating circuit end, the combination of gates B1M, B1SC and B10 functions in the same manner as do A1M, A1SC and A10. Thus pulses representing all busy channels in the first or A multiplex serving originating circuit 1L are applied to the mixing gate ASC (FIG. 5), and pulses representing all busy channels in the second or B multiplex serving terminating circuit FL are applied to the mixing gate BSC (FIG. 5). The outputs from ASC and BSC are fed to a control gate C as inhibiting inputs, that is, a pulse on either one of these inputs blocks the gate C. Pulses occupying all the time positions in a multiplex cycle, i.e. corresponding to all channels in a multiplex system, are applied from the common pulse generator PG (not shown) to this gate. Therefore gate C only passes pulses which correspond to channels which are free in the two multiplex systems to be interconnected.

Therefore gate C passes the pulse which corresponds to the first free channel in the two multiplex systems to be interconnected, and this pulse passes to the gates between circuits and link groups and the gate between the two link groups. It reaches the originating circuit gate amplifier AGA1 concerned via gate L10, opened due to 1L being in the calling condition. The circuit AGA1 therefore applies this pulse as a half-write pulse to the gate store S1 and also opens the gate GA1 so as to connect the originating circuit to the link group HA1. AGA1 also, of course, causes pulses at this newly-seized time position to be applied to the gate A1M mentioned above.

The pulse for the seized time position is also applied to gate GC110, and similar gates for other connections between link groups. GC110 is open due to the two circuits 1L and FL being respectively in the calling and called condition, and so the pulse passes to the "cross-point" amplifier AGG11, which sets the store S2 controlling the "link group" gate to store the indication for the seized time position. Then on each subsequent occurrence of that time position, the "cross-point" gate which interconnects the two link groups concerned is opened.

The pulse operates in the second link group, setting store S3 via AGB1 and controlling gate GB1 in a manner similar to the corresponding operation at the originating circuit end of the connection.

In the controller, the pulse for the seized time position operates trigger SF to inhibit the gate C and ensure that no multiple seizure occurs. Reset of SF occurs at any convenient time after the selection has been successfully effected, so that the controller is freed for use for controlling another connection.

The initiation of the process involved in interconnecting two link groups can be arranged to coincide with the gap between consecutive cycles of the multiplex, in which case progressive search is obtained, as in the controller used in the system described in the above-mentioned application No. 536,963. Alternatively the start of operations can be allowed to occur at random.

The release of a connection is controlled over common leads for the link groups, e.g. over leads *ha1* and *hb1* for the link groups A1 and B1 respectively. It is assumed that calling party release is used, and that the connection to be released is the one whose setting up is described above.

Figure 4:
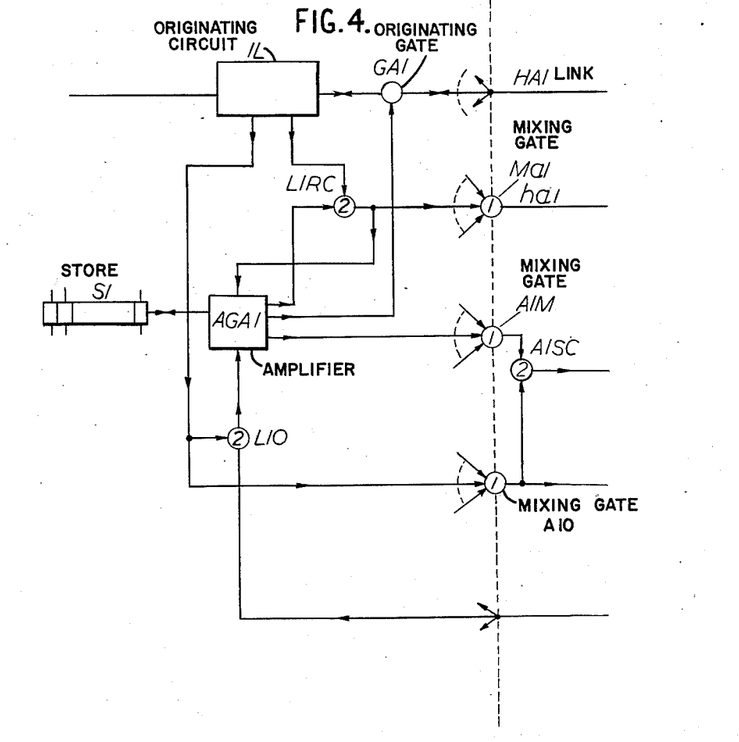
FIGS. 4, 5 and 6, of which FIG. 5 should be placed to the right of FIG. 4 and FIG. 6 should be placed to the right of FIG. 5, together show how a connection is established through the multiplex arrangement in the exchange of FIGS. 2 and 3.

The originating circuit 1L receives supervisory signals from the calling subscriber's line which indicate the end of the call, and thereupon applies a condition to the gate L1RC (FIG. 4). The arrangements for dealing with supervisory signalling will be described later. When the time position which is in use for the connection occurs, the above-mentioned gate L1RC opens and applies a pulse to AGA1 to inhibit the half-write pulse applied therefrom to S1. This is applied to the connection IC shown in FIG. 7. Therefore the re-writing of the recording for the seized time position is prevented. The output from L1RC is also applied via the mixing gate Ma1 and the release wire ha1 for the link groups to the intermediate amplifiers such as AGC11 which serve the cross-points in which link group HA1 appears. This amplifier is similar to AGA1, and so re-recording of the seized time position is prevented. This inhibit action is applied to all the amplifiers serving cross-points at which A1 appears, but is only effective on AGC11 since this is the only one which has been using the time position in question.

The amplifier AGC11 also passes the pulse to the wire hb1 and therefrom to the amplifier AGB1 controlling the store S3. This pulse prevents the usual half-write pulse from occurring so that the connection is now fully released. The release of the connectors and circuits follows in a manner similar to that in the system of our application No. 536,963.

It will be appreciated that some of the originating circuit in the exchange may be connected to junctions incoming to the exchange, and that some of the terminating circuits may be connected to junctions outgoing from the exchange.

*Supervisory arrangements (Fig. 8)*

Figure 8:
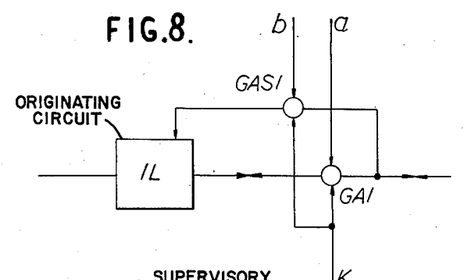
FIG. 8 is a simplified circuit diagram which shows how the circuits of FIGS. 4 to 6 should be modified to deal with supervisory signalling.
Figure 10:
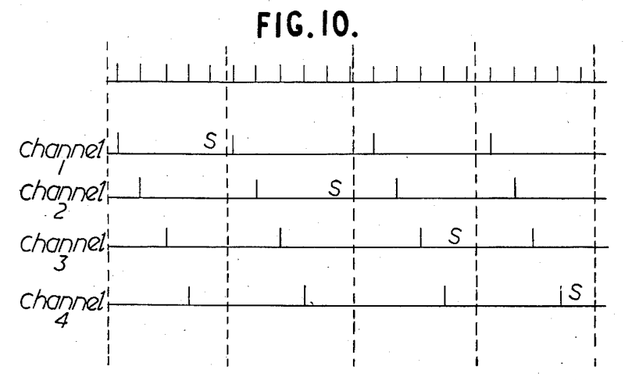
FIG. 10 is a diagram of pulse waveforms which will be referred to when the circuits of FIGS. 8 and 9 are described.

FIG. 8 shows the modifications necessary to the circuit of FIG. 4 to deal with the first of the methods of dealing with cross-office supervision mentioned in the general introduction, while FIG. 10 is a waveform diagram which assumes a 4 channel multiplex in the interests of simplicity. The top line of the diagram shows the basic pulse repetition pattern divided into groups of five. The first channel takes as its working, or modulated pulses the pulses number 1, 8, 11, 16, . . ., the second takes pulses 2, 7, 12, 17, . . ., the third takes pulses 3, 8, 13, 18, . . . Pulses 5, 10, 15, 20, . . . are not to be used for the conveyance of speech at all. Instead, pulses 5, 25, 45, . . . will be used for supervision for channel 1, pulses 10, 30, 50, . . . will be used for channel 2, etc. Hence the fifth pulses, i.e. the extra pulse added to each cycle, can be regarded as a sub-multiplex each channel of which is allocated to one of the channels of the main multiplex system. Thus the supervisory intelligence is controlled at a repetition frequency which is on $n$th of the basic speech sampling frequency.

The driving leads to the gate-controlling stores will each carry a pulse pattern corresponding to one of the other rows of FIG. 10, i.e. a regular speech sampling pulse interleaved at a lower frequency with the supervisory control pulse. In the central stores and gates of FIG. 5 these two classes of pulse will be identical, and so the "link group" gates will behave in the same way for either type of pulse. That is, no change is necessary to the circuitry associated with the link group gates to enable them to deal with supervisory signalling.

To enable the originating circuit-link group connection to deal with supervisory pulses an additional gate is provided for each originating circuit-link group gate. FIG. 8 shows the additional gate GAS1 for gate GA1. These gates are both driven via the connection K by the same master pulse from the associated amplifier AGA1 (not shown in FIG. 8). They are also, however, controlled by two further pulses $a$ and $b$ from the master pulse generator. Pulse $a$ coincides with all regular speech sampling pulses and hence allows operation of the speech gate GA1 when the channel pulse occurs. Pulse $b$ is supplied from the generator when a supervisory pulse is to be dealt with, i.e. its frequency is $1/n$ times that of pulse $a$. When this pulse occurs gate GAS1 opens and at the same time a simple circuit in 1L for dealing with supervision is enabled. At the same time as the arrangement of FIG. 8 operates as just described, a corresponding supervisory control gate at the terminating circuit end is opened, so that supervisory signalling between the two circuits is possible.

Figure 9:
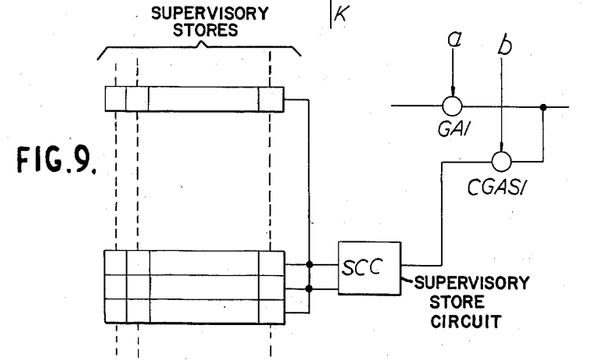
FIG. 9 is a simplified circuit diagram of an alternative arrangement for dealing with supervisory signalling in an exchange using circuits such as those of FIGS. 4 to 6.

FIG. 9 is an alternative arrangement to that of FIG. 8, and is proposed for use where supervisory intelligence is not handled directly by the originating circuit, but by a common channel supervisory circuit using a number of additional stores in series with the regular gate-controlling memories and on the same pulse leads. Here there is no need for an individual gate per originating circuit-link group connection; instead, one gate such as CGAS1 serves for each link group, this gate being controlled by the $b$ pulses. Hence the supervisory intelligence is diverted to the supervisory control circuit SCC, from whence it is stored in the appropriate store. It will automatically be linked with the correct channel by the presence of a half-write pulse on the main driving lead of one store only, as already described with reference to FIG. 7.

While the principles of the invention have been described above in connection with specific embodiments, and particular modifications thereof, it is to be clearly understood that this description is made only by way of example and not as a limitation on the scope of the invention.

What I claim is:

1. An automatic telecommunication exchange for establishing connections between calling and called lines, a multiplex link including a group of time-division channels, a group of inlets and a group of outlets, the number of inlets and outlets in each group being fewer in number than the calling and called lines and greater in number than the channels in said link, a first switching stage and means for operating it to connect any calling line to an idle one of said inlets, recording means for recording called telephone numbers received over said connected line which are indicative of any desired called line, marking means controlled by said recording means for marking the said desired line, a second switching stage and means for operating it to connect the marked called lines to an idle one of said outlets, first and second gating means for connecting respective inlets and outlets to said multiplex link, and a control circuit for controlling said first and second gating means to connect the inlet to which the calling line is connected to the outlet to which the called line is connected over a selected channel of the said multiplex link.

2. An automatic telecommunication exchange for establishing connections between calling and called lines, a first and a second multiplex link each including a group of time-division channels, a group of inlets fewer in number than the calling lines and greater in number than the channels in the first multiplex link, a group of outlets fewer in number than the calling lines and greater in number than the channels in the second multiplex link, a first switching stage and means for operating it to connect any calling line to an idle one of said inlets, recording means for recording called telephone numbers indicative of any desired called line, marking means controled by said recording means for marking the said desired line, a second switching stage and means for operating it to connect the marked called line to an idle one of said outlets, first gating means for connecting any inlet to the first multiplex link, second gating means for connecting any outlet to the second multiplex link, link gating means for selecting and connecting a channel in the first multiplex link to a channel in the second multiplex link, and a control circuit for controlling said first, second and link gating means to connect the inlet to which the calling line is connected to the outlet to which the desired called line is connected over a selected idle time-division channel in the first and in the second multiplex links.

3. An automatic telecommunication exchange as claimed in claim 2, and in which said control circuit includes a gate circuit, means for applying to said gate circuit time-position pulses which correspond to all of the channels of a multiplex link, means for applying to said gate circuit inhibiting pulses from the multiplex link serving a busy inlet such that each such pulse disables said gate circuit for the duration thereof, means for applying to said gate circuit inhibiting pulses from the multiplex link serving a busy outlet such that each such pulse disables said gate circuit for the duration thereof, whereby said gate circuit is disabled at the time position which corresponds to channels which are in use in either of the multiplex links via which a connection is to be set up, and means responsive to the passage of a pulse through said gate circuit, which pulse corresponds to a channel which is free in both of the multiplex links via which the connection is to be set up, to effect the interconnection between the inlet and the outlet to be connected at the time position to which that pulse corresponds.

4. An automatic telecommunication exchange as claimed in claim 2, in which the release of a connection is effected in response to the release of the calling line, in which an auxiliary link is provided in parallel with the first and second multiplex links for the transmission of release signals, and in which the connection via said multiplex links is released stage by stage in response to a release signal transmitted over the said auxiliary link.

5. An automatic telecommunication exchange as claimed in claim 2, in which each said gating means includes individual gating means for every possible connection therethrough, storage means associated with each said individual gating means, and means responsive to the selection of a channel to be used for a connection through an individual gating means to record in the storage means for that individual gating means the time position at which that individual gating means of the selected channel is to be repeatedly opened thereafter.

6. An automatic telecommunication exchange as claimed in claim 5 and in which said storage means comprises a co-ordinate matrix of ferro-magnetic storage elements, of which each column is allotted to one time position in the channel and each row is allotted to one of said individual gating means, means for generating a series of time-position pulses corresponding to the channels in said multiplex links, means for applying said pulses to respectively corresponding columns, and means responsive to the application of a time-position pulse to an element of a row which has been set to its operated condition to open the individual gating means associated with that row.

7. An automatic telecommunication exchange as claimed in claim 2, and in which said marking means comprises a plurality of static electrical registers, one of which is seized in response to the initiation of a call on a calling line, a distributor which renders registers which are ready to control a connection effective one at a time, and a called line marker to which the said recorded number is transferred from a register which has been rendered effective by said distributor, said called line marker thereupon effecting said marking of the desired called line.

8. An automatic telecommunciation exchange as claimed in claim 2, and in which each of said first and said second switching stages comprise a number of static electrical switching devices.

9. An automatic telecommunication exchange as claimed in claim 2, and in which each said switching stages each comprise a number of electromechanical coordinate multiswitches, each of said multiswitches serving a number of calling and called lines.

10. An automatic telecommunication exchange according to claim 2, in which the multiplex links include a number of supervisory channels which are used for the transmission of supervisory information relating to connections established via said time-position channels of the first and second multiplex links, in which said supervisory channels are each available for use for the transmission of supervisory information in respect of a connection established over a particular one of said time-position channels, and in which the common repetition frequency of said supervisory channels is a submultiple of the common repetition frequency of said time-position channels.

11. An automatic telecommunication exchange as claimed in claim 10, and further comprising means for obtaining said supervisory channels by allocating a complete cycle of the multiplex links for the transmission of supervisory information, there being one such cycle allocated for the transmission of supervisory information in a relatively large number of cycles of the multiplex links, and in which each channel of an allocated cycle comprises means to convey supervisory information in respect of a communication connection set up over the corresponding channel of the cycles used for the transmission of the communication intelligence.

12. An automatic telecommunication exchange as claimed in claim 11, and comprising means for obtaining said supervisory channels by adding to each cycle of the multiplex link an extra time position, and means for making the extra time position available for the transmission of supervisory information over connections using different ones of said connecting channels on different multiplex cycles.

13. An automatic telecommunication exchange as claimed in claim 12, and comprising a detection circuit associated with each inlet to a multiplex link is connected thereto via a gate, and means for opening said gate only during the extra time position allocated to a connection which has been set up via the time-position channel with which that extra time position is associated.

14. An automatic telecommunication exchange as claimed in claim 12, and which comprises a storage device for supervisory information associated with said multiplex cycle, and having a section per time-position channel of that multiplex link, a single gate interconnecting said storage circuit and the multiplex link and arranged to open on each occurrence of the extra time position, and control means for said storage circuit which causes the supervisory information received at the extra time position for a time-position channel to be stored in the section of said storage device for that channel.

References Cited in the file of this patent
UNITED STATES PATENTS

| | | |
|---|---|---|
| 2,490,833 | Ransom | Dec. 13, 1949 |
| 2,541,932 | Melhose | Feb. 13, 1951 |
| 2,773,934 | Trousdale et al. | Dec. 11, 1956 |